Nov. 19, 1957  A. P. SORBER  2,813,956

HELICAL VARIABLE RESISTORS

Filed March 30, 1953

INVENTOR
A. PAUL SORBER

BY LeRoy J. Leishman

AGENT

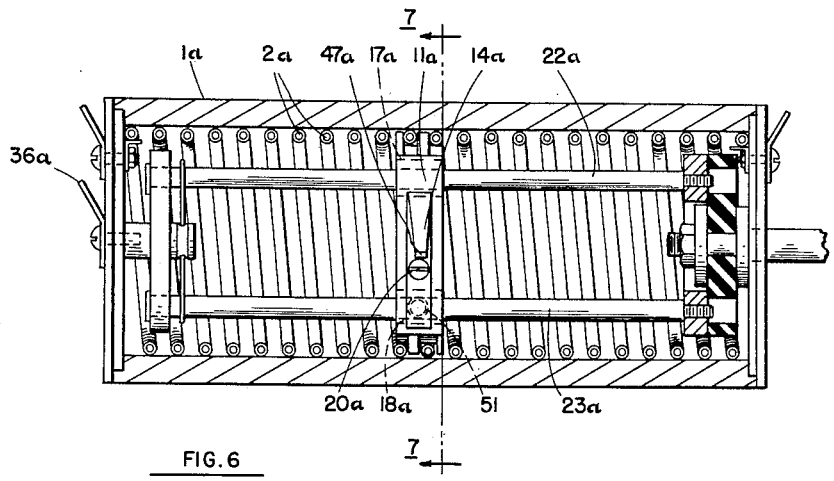
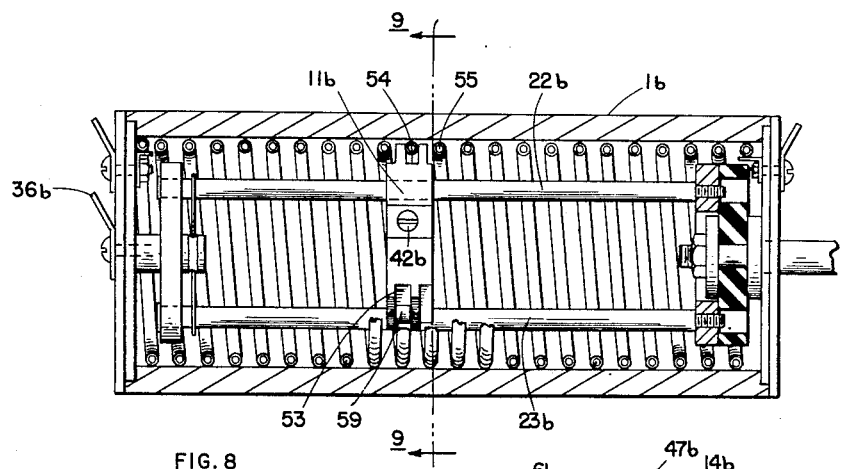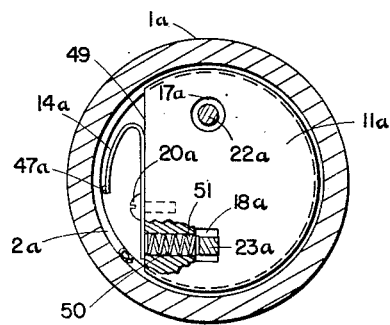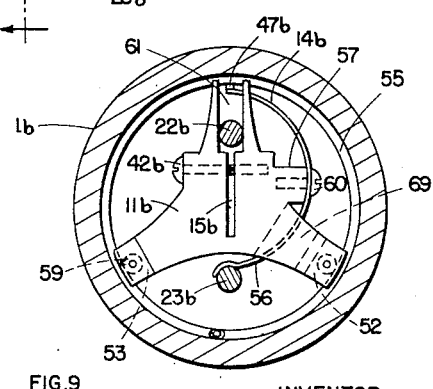
INVENTOR
A. PAUL SORBER
BY LeRoy J. Leishman
AGENT Nov. 19, 1957     A. P. SORBER     2,813,956
HELICAL VARIABLE RESISTORS
Filed March 30, 1953     5 Sheets-Sheet 3
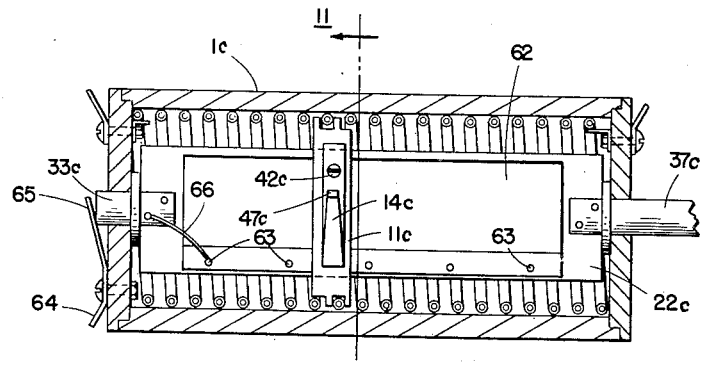
FIG. 10
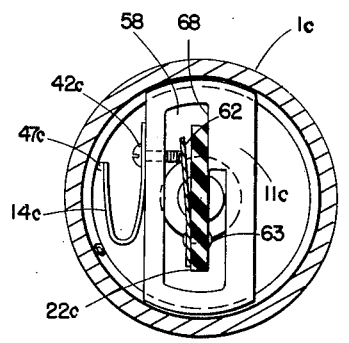
FIG. 11
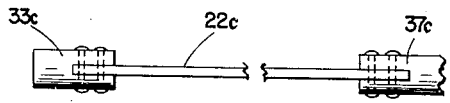
FIG. 12
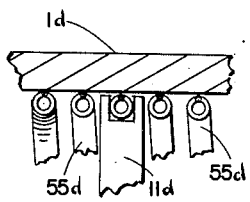
FIG. 13
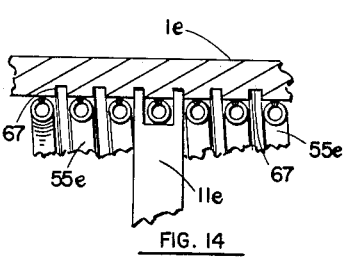
FIG. 14
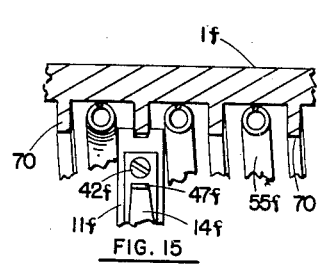
FIG. 15
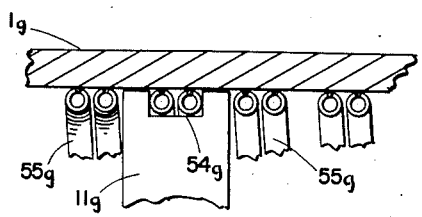
FIG. 16
INVENTOR
A. PAUL SORBER
BY *Le Roy J. Leishman*
AGENT Nov. 19, 1957     A. P. SORBER     2,813,956
HELICAL VARIABLE RESISTORS
Filed March 30, 1953     5 Sheets-Sheet 4
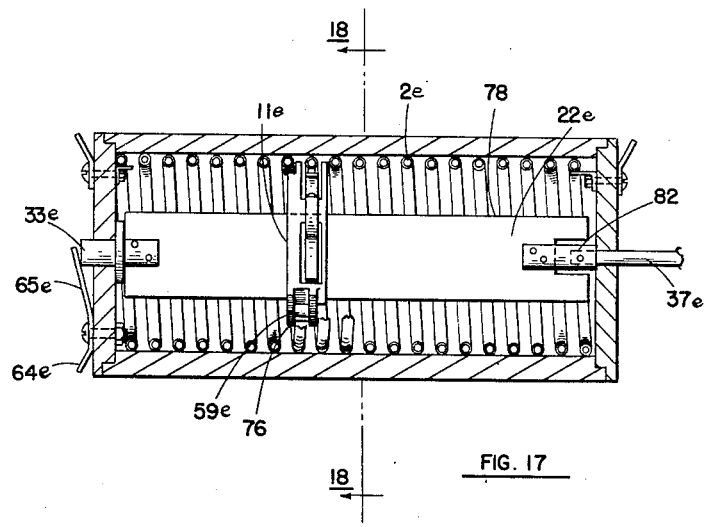
FIG. 17
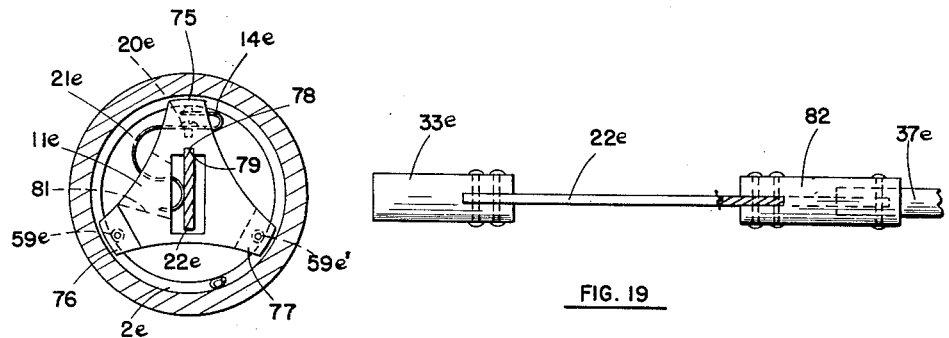
FIG. 18
FIG. 19
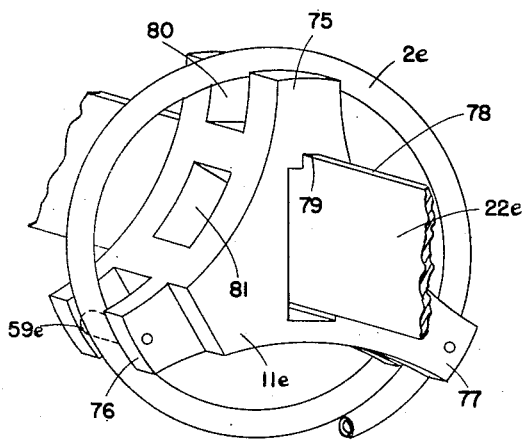
FIG. 20
INVENTOR
A. PAUL SORBER
BY *Le Roy J. Leishman*
AGENT Nov. 19, 1957     A. P. SORBER     2,813,956
HELICAL VARIABLE RESISTORS Filed March 30, 1953     5 Sheets-Sheet 5

INVENTOR
A. PAUL SORBER
BY *LeRoy J. Leishman*
AGENT

United States Patent Office 2,813,956
Patented Nov. 19, 1957

2,813,956

HELICAL VARIABLE RESISTORS

Adelbert Paul Sorber, Los Angeles, Calif.; Gordon Paul Sorber, administrator of said Adelbert Paul Sorber, deceased Application March 30, 1953, Serial No. 345,440

5 Claims. (Cl. 201—56)

The invention herein described pertains to variable resistors of a type used in the electrical and electronic industries, and more particularly to rheostats and potentiometers in which the resistance elements are helically wound.

In variable resistors of the kind with which the present invention deals, the devices of the prior art have employed a contact supporting member mounted on a central rotor connected to the control shaft. The spacing of the contact support with respect to the helical resistance elements has thus depended upon the rotor, and the method of slidably mounting the contact support on the rotor has usually been such that it has been very difficult to avoid back lash and angular play. One of the objects of the present invention is to provide a construction that will keep back lash and angular play at a minimum.

A further object is to provide a construction in which the assembly that comprises the rotor and wiper is of lighter construction than has been provided by the prior art in order to reduce the inertia and starting torque of the rotating parts as well as the momentum that would otherwise interfere with immediate stopping.

Another object is to provide a construction that will permit the contact carrier to approach closer to the ends of the cylindrical assembly than has heretofore been possible. In the prior art, the close approach of the contact to one end of the cylindrical assembly has usually been obtained by sacrificing space at the opposite end.

A further object is to provide a construction in which the carrier for the wiper may have a shorter dimension parallel to the axis of the rotor than has usually been possible in prior art devices. Heretofore a long bearing surface between the carrier and rotor has been relied upon in order to prevent rocking or displacement of the carrier from its mounting on the rotor.

Still other objects will become apparent as the specification proceeds.

In the drawings:

Fig. 6 is a longitudinal section through a different embodiment of my invention.

Fig. 7 is a cross section, partly broken away, taken on line 7—7 of Fig. 6.

Fig. 8 is a cut away longitudinal view of a third embodiment of my invention.

Fig. 9 is a section taken on line 9—9 of Fig. 8.

Fig. 10 is a longitudinal view, partly cut away, of still another type of potentiometer embodying my invention.

Fig. 11 is a section through the device of Fig. 10 taken on a line corresponding to line 11—11 of the said figure.

Fig. 12 is a fragmentary top view of the rotor and shafts of the device of Figs. 10 and 11, showing how the rotor is attached to the shafts.

Fig. 13 illustrates one method by which the wiper support may be made to advance axially or longitudinally as it rotates with respect to the helix.

Fig. 14 is a fragmentary view showing still another method of keying the wiper support to the cylinder assembly of which the helix is a part so that the support will advance with each revolution thereof by an amount equivalent to the pitch of the helix.

Fig. 15 illustrates by a fragmentary section one more method of keying the support to the cylinder walls so that it will advance with each revolution by an amount equal to the distance between adjoining convolutions of the helix.

Fig. 16 is another view similar to Figs. 13, 14 and 15 but illustrating the cooperation of the rotatable contact with two helices or a double helix such as those shown in my co-pending application Ser. No. 335,947, filed February 9, 1953, now Patent No. 2,747,061, issued May 22, 1956.

Fig. 17 is a longitudinal view, partly broken away, of still another embodiment of my invention.

Fig. 18 is a section taken generally along line 18—18 of Fig. 17.

Fig. 19 is a top view of the rotor of the device of Fig. 17.

Fig. 20 is an isometric projection of the rotor, carrier and cooperating portions of the helix of Figs. 17 and 18.

In helical potentiometers it is customary to cement or otherwise attach the helical resistance element to the inside of the cylinder that forms the support and casing for the entire assembly, and the helix and cylinder then become a unitary or integral structure that will hereinafter be referred to as the cylinder assembly, it being understood that such assembly comprises not only the cylinder and helix but also any grooves, beads or other relief pattern that may be formed on the inner wall of the cylinder itself.

Figure 1:
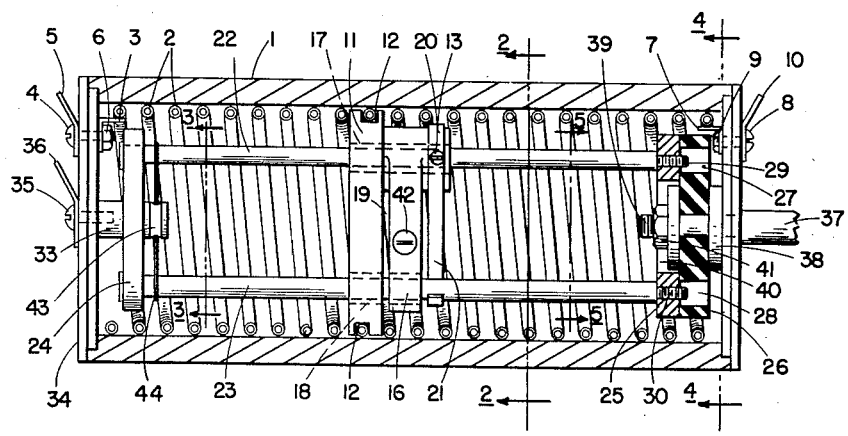
Fig. 1 is a longitudinal view, partly cut away, of one form of helical potentiometer in which any invention is embodied.

In Fig. 1, the helix 2 is cemented or otherwise suitably attached to the inside of the cylinder 1. A bracket 3 is in physical and electrical contact with one end of the helix 2 and a screw 4 connects this bracket with a terminal lug 5, the nut 6 serving to tighten the screw, lug and bracket in mounted position. Another bracket 7 at the right end of the instrument electrically engages the right end of the helix and is held in position by the screw 8 and nut 9 which also serve to electrically connect the bracket with the terminal lug 10. The peripherally threaded or recessed member 11 forms a support for the contact or wiper. Member 11 is threaded or provided with a helical groove 12 to match the guide helix on the inside of the cylinder assembly, the guide helix in this particular embodiment being the helical resistance element itself. It will be understood, however, that a peripherally keyed disc may be caused to advance by a helical groove formed in the cylinder proper, or the groove in the support member 11 may cooperate with a helical bead 70, as indicated in Fig. 15. It should thus be clear that a suitable track or guide for the contact supporting member 11 may be provided either by the resistance element itself, by a helical groove in the cylinder wall, by a projecting helical track, or by any other equivalent helical guide.

The supporting member 11 has a projection 13 on one side which carries the contact or wiper spring 14. This projection has a depending portion 16 which, when the device is oriented as in Fig. 2, extends downwardly and is cut away or recessed from the main body of member 11, as shown at 19. It will be noted that the projection 13 extends axially from the main body of member 11 by a greater distance than does the depending portion 16.

Figure 2:
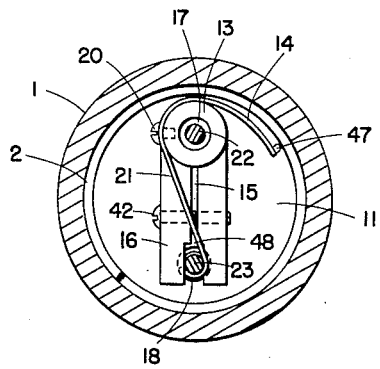
Fig. 2 is a cross section through my device, taken at a position corresponding to line 2—2 of Fig. 1.

Member 11 has an aperture 17 therethrough that is parallel to the member's axis of rotation, this aperture extending from the left side of member 11 all the way through the rounded extension or boss 13. Another opening 18, disposed parallel to the hole or opening 17, also passes through member 11 and is displaced from the axis of the member by about the same distance as is aperture 17. The depending projection 16 has a rectangular notch or recess therein, as shown in Fig. 2, this notch 48 being aligned with aperture 18. A slot 15 extends from the top of recess 48 substantially to the main rounded portion of projection 13, this slot being symmetrically arranged with respect to the recess. A screw 20, passing through the spring contact member 14, attaches this spring to boss 13. Spring 14 has a downwardly extending portion 21, the purpose of which will be explained hereinafter.

Applicant desires to point out that the contact 14 is entirely supported by member 11 and its integral projection 13, and that member 11, in turn, is supported solely by the main cylinder assembly with which it may be considered to be in threaded engagement. The rotor assembly, now to be described, thus plays no part in supporting the contact member, its sole functions being to apply a turning moment to member 11 and to provide a means whereby the contact 14 may electrically communicate with a suitable terminal on one end of the main casing.

Figure 3:
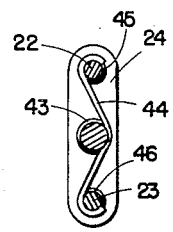
Fig. 3 is a cross section through the device of Fig. 1, taken at a position corresponding to line 3—3.
Figure 4:
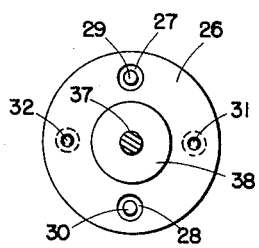
Fig. 4 is a cross section of the device of Fig. 1 taken on line 4—4 thereof.
Figure 5:
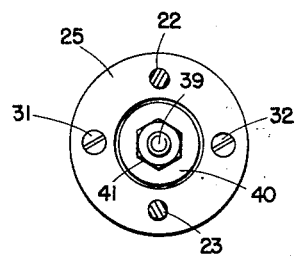
Fig. 5 is a cross section taken on line 5—5 of Fig. 1.

The rotary assembly that applies the turning moment to supporting member 11 comprises two metallic rods 22 and 23. The reduced left ends of these rods pass through the end member 24, Figs. 1 and 3, to which they are attached by suitable staking or peening. The right ends of the rods are threaded into, or otherwise suitably attached to, a centrally apertured disc or ring 25. A non-conducting disc 26, Figs. 1 and 4, is recessed as shown at 27 and 28, these openings being sufficiently large to clear the ends 29 and 30 that project through ring 25. This ring is attached to the non-conducting disc 26 by screws 31 and 32, Figs. 4 and 5.

The rods 22 and 23, the end piece 24, the opposite end assembly comprising the ring 25 and disc 26, and the interconnecting screws 31 and 32, all combine to form a rigid rectangular assembly. This assembly is pivoted at its left end on a short shaft 33 that passes through end piece 24, and this stub shaft is mounted on the end member 34 of the potentiometer housing by means of a screw 35. This screw passes through a terminal lug 36 and then through the end member 34 and into a threaded hole in the center of the shaft. At the right end of the device a control shaft 37, having a projection or flange 38 and a threaded reduced portion 39, passes through a central aperture in the non-conducting member 26. A washer 40 encircles the threaded portion 39, and a nut 41 tightens the shaft 37 with its flange 38 firmly to the non-conducting member 26 and thus to the rectangular assembly of which this non-conducting disc is a part. This non-conducting disc serves to insulate the control shaft 37 from the conducting rods 22 and 23. Rod 22 passes through opening 17 in member 11 and boss 13, as clearly shown, particularly in Fig. 2. It should be noted here that shaft 22 does not make contact with the sides of hole 17, this hole merely providing a channel through which rod 22 may pass. Shaft 23 goes through opening 18 in member 11, as shown in Figs. 1 and 2, and thence through recess 48 in the depending portion 16. Screw 42 extends through a clearance hole in the left side of projection 16 and is then threaded into the right side of the projection. Opposite sides of the recess 48 may be brought into engagement with rod 23 merely by tightening the screw 42. This screw should be adjusted so that the opposite walls of recess 48 loosely engage rod 23. It is this rod that applies a turning moment to member 11, and screw 42 should accordingly be adjusted so that there is no play between the sides of the slot and the rod, but the tension should not be great enough to interfere with the free longitudinal movement of member 11 along rod 23.

It will be observed in Fig. 2 that the lower end 21 of the contact spring 14 extends to the right of rod 23. This lower portion of the spring is held yieldingly against rod 23 so that good electrical contact is maintained without introducing appreciable resistance to longitudinal movement.

If desired, it is possible to dispense with screw 42 and with the slot that separates the two sides of the depending projection 16 and to use the resilience of spring 21 to eliminate play between rod 23 and the sides of recess 48. In this case, recess 48 should provide easy clearance for rod 23, and if spring 21 has sufficient tension not to flex when member 11 is turned counterclockwise, this lower portion of the spring will take all play out of the connection with shaft 23. The shaft will then remain in engagement with the left wall of recess 48 and with the portion of the contact spring that curves part way around shaft 23.

The stub shaft 33, which rotatably mounts the left end of the rotor assembly, is provided with an annular groove 43. A piece of spring wire 44 extends through a portion of this groove, as shown in Fig. 3, and then in opposite directions around corresponding grooves 45 and 46 in rods 22 and 23 respectively. This spring serves to assure a good electrical connection between the rotary assembly and the stub shaft 33 and also tends to reduce longitudinal movement of the rotor assembly. As previously explained, a terminal lug 36 is mounted under the head of screw 35, and it will be clear that the contact member 14 is in electrical communication with this lug through the electrically interconnected parts already described. The lower end 21 of the contact spring 14 makes connection with rod 23, and from thence the current passes through the end piece 24 and the spring 44, the stub shaft 33, and finally through the screw 35 to the terminal 36.

In the embodiment of my invention that has just been described, it will be clear that the rotating carrier 11 for the contact spring 14 is well supported at widely separated points and that the small piece of contact metal 47 on the end of spring 14 will slide along the helix whenever the rotor assembly applies a turning moment to the carrier 11 by means of the recess 48 in depending portion 16.

It will be apparent to those skilled in the art that it is not necessary for all points around the periphery of the contact supporting member 11 to engage the helical guide on the inside of the cylinder assembly. Various portions of the carrier member may be cut away. Modifications of this nature are illustrated in some of the remaining figures that will hereinafter be discussed. In the additional embodiments now about to be described, the various components which correspond to those in the species just discussed will be referred to by similar reference characters, and in most cases the same reference numerals will be used that designate the corresponding parts in the previously described figures, excepting that in each of the additional embodiments these reference numerals will be followed by a lower case letter. When the construction is the same as that in the embodiment already described, the details of construction will not be discussed, but it will be possible to identify the various parts by the numbering system just set forth.

Fig. 6 is a longitudinal section partly cut away of another embodiment of my invention. In this modification, the contact supporting member 11a is not completely circular, a segment being omitted to leave a flat chordal edge 49 on which the wiper 14a is mounted by means of screw 20a.

In this second species of my invention, the wiper 14a is attached to the segmental disc 11a by means of screw 20a. A rod 22a (which may be round, rectangular, or of other cross sectional form) extends through an opening 17a in the disc; and another rod 23a, indicated here as having a rectangular cross section, likewise passes through the supporting member 11a, a rectangular clearance hole 18a being provided. A compression spring 50 in recess 51 in member 11a expands between the lower part of the wiper spring 14a and rod 23a, and this compression spring's pressure against the under side of the fixed portion of the wiper causes disc 11a to rotate in a clockwise direction until the right side of recess 18a engages the right side of rod 23a, as shown in Fig. 7. Compression spring 50 also provides an electrical connection between wiper 14a and rod 23a. This rod is in electrical communication with lug 36a on the left end of the potentiometer assembly, the electrical connections from rod 23a to lug 36a being the same as those between rod 23 and lug 36 in the previously described embodiment.

Bar 23a applies the turning moment to disc 11a, counterclockwise rotation resulting when bar 23a presses against the right side of recess 18a, and clockwise rotation ensues when bar 23a presses on compression spring 50. This spring must of course be strong enough to resist any compression during such movement.

It will be clear that disc 11a, even though it is only a segment of a completely circular disc, nevertheless presents sufficient surface to the helix on the inner walls of the cylinder assembly to give this member 11a adequate support. The general operation of this embodiment of my invention is, of course, substantially the same as that for the embodiment previously described.

Fig. 8 is a longitudinal view, partly cut away, of still another embodiment of my invention. In this form, the contact supporting assembly 11b makes contact with the helix at three different points, each angularly separated from the other two points by an angular distance of substantially 120°. It will be noted in Fig. 8 that these guide portions or recesses are staggered, and that recess 53 is further to the left in the main body of assembly 11b than is the symmetrically disposed recess 54 at the top of the member. Recesses 52 and 53 contact the spiral guide or helix 55 at points that are angularly displaced by about 120° clockwise and counterclockwise, respectively, from recess 54, and the staggering of these recesses—that is, their right and left variations from a central position—is necessitated by the pitch of the helix, and it will be clear that each of these recesses must be displaced with respect to the other recesses by an amount equal to one-third of the pitch of the helix.

The recesses 52, 53, and 54 are located in what might be called legs of the main support, these legs of course being so spaced that the recesses are in their proper relative positions. To reduce the friction that would otherwise be present if the bottoms of these recesses directly engaged the helical resistance element or other helical guide, a roller, such as roller 59, shown in recess 53, may be mounted in at least two of these recesses. The spring wiper member 14b is attached to a projection 57 on the support 11b by means of screw 60. This leaf spring 14b is so shaped that the contact 47b on its free end is disposed within recess 54. This spring not only serves to hold the contact 47b against the resistance element, but its resilient action urges roller 59 and the corresponding roller in recess 52 into engagement with the helix. This structure thus serves to eliminate both play and friction.

Shaft 23b, as shown in Fig. 9, passes beneath member 11b without engagement therewith. The lower extension 56 of the wiper spring 14b extends through an opening 69 in the supporting member 11b and partially encircles rod 23b, thus assuring good electrical contact therewith so that the contact 47b will be in electrical communication with the lug 36b on the left end of the potentiometer casing, the electrical interconnections being the same as those described in the discussion of the embodiment first described.

In the embodiment of my invention now under discussion, the turning moment is supplied to the contact carrier 11b by rod 22b. It will be observed that a slot 15b extends from recess 61 toward the central portion of member 11b and that a screw 42b is provided to bring the portions of member 11b that are on opposite sides of recess 61 into contact with rod 22b. The adjustment of screw 42b should be such that the sides of recess 61 engage rod 22b with sufficient tension to eliminate side play without interfering with longitudinal movement of the contact carrier 11b with respect to this rod.

Fig. 10 is a longitudinal view, partly broken away, of still another embodiment of my invention. In this form, the contact carrier 11c engages the helical guide on the inner walls of the cylinder assembly at points that are spaced by about 180°. The rotor consists mainly of a non-conducting plate 22c, which is supported at one end by a stub shaft 33c and at the other end by the control shaft 37c. The ends of these shafts are slotted to receive the rotor plate, as illustrated in Fig. 12. Since no invention is claimed in the mounting per se of the plate 22c, additional structural features with respect thereto will not be described here.

The contact carrier 11c has an elongated opening 58 extending therethrough as shown in Fig. 11. A resilient metal member 62 is attached to one side of plate 22c by rivets 63, and plate 22c and this resilient member extend through slot 58 in the carrier. The curved leaf spring 14c with the wiping contact 47c thereon is attached to the carrier member 11c by screw 42c. The end of this screw protrudes into the recess 58 and engages the rectangular leaf spring 62 near its free edge, as clearly shown in Fig. 11. This screw connection thus forms an electrical path between the contact 47c and the conducting plate 62.

It will be noted that the carrier member 11c has a shoulder 63 which extends into the upper right side of the recess 58 and that when the rotor 22c is turned clockwise its engagement with shoulder 63 will turn the carrier 11c in the same direction. Similarly, if the carrier member is turned counterclockwise, the pressure of the leaf spring 62 against the end of screw 42c will cause carrier 11c to rotate counterclockwise. The conducting plate 62c thus serves two mechanical purposes: it affords a means for transmitting counterclockwise motion from the rotor to the carrier 11c, and it removes play from the connection between the rotor and the carrier without the necessity of a special adjustment. This conducting member also serves as one of the electrical connecting means between the wiper 47c and the terminal lug 64 on the left end of the potentiometer assembly. This lug has a resilient upper end 65 that engages the left end of the stub shaft 33c and a conductor 66 connects the right end of this stub shaft with plate 62 by means of one of the rivets 63. Current thus may flow from contact 47c through the wiper spring 14c, screw 42c, plate 62, rivet 63, conductor 66, shaft 33c, and the resilient portion of lug 65 to its external terminal end 64.

It is not necessary in any embodiment of my invention that the carrier be keyed specifically to the resistance element. It must, of course, be keyed to some kind of helix on the inside of the cylinder assembly, but a suitable helix may be formed in the cylinder itself. The guide helix may thus be the resistance element itself, as indicated by the numeral 55 in previous figures and in Fig. 13, or it may be a helical groove formed in the cylindrical casing between the turns of the helically wound resistance element. Such an alternative arrangement is shown in Fig. 14 where it will be observed that the convolutions of the groove 67 are interposed between the turns of the resistance element 55a. Fig. 15 shows still another method of keying the carrier to the cylinder assembly. In this variation, the carrier 11d is mated to a helical bead 13. Any of these methods of rotatably keying the carrier to the cylinder assembly is satisfactory and it is contemplated that any of them may be used as alternative means of practicing my invention. It is merely necessary that the carrier may be movably keyed to some sort of a helix that forms a variation in relief on the inside of the cylinder assembly, but such relief helix may be either the resistance element, a groove, or a projection.

Fig. 16 illustrates an arrangement in which the slot 54g straddles two helices, as taught in my co-pending application Ser. No. 335,947 filed February 9, 1953, now Patent No. 2,747,061 issued May 22, 1956. When two helices are used, the helices themselves may be employed for guiding the carrier, or suitable grooves or projections may be formed between the helices, as shown in Figs. 14 and 15.

The contact carriers of the prior art have depended upon a long sliding bearing on the rotor in order to prevent rocking. Many of these carriers have been provided with a tongue fitting into a longitudinally disposed groove on the rotor, and the tongue has had to be relatively long to prevent rocking of the carrier in a direction parallel to the rotor's axis. Inasmuch as such tongue has usually been held in the rotor slot merely by the resilience of the wiper spring, it has only been the lateral extensions of the tongue on each side of the wiper that have prevented the tongue from being twisted out of the slot. These lateral extensions have made it impossible for the wiper to approach very close to the extreme ends of the cylindrical housing. In devices embodying the present invention, rocking is prevented by widely spaced bearings on the inner surface of the cylindrical housing or upon the helix itself rather than by the contacting surfaces of the carrier and rotor, and it is consequently not necessary for the carrier to have wide lateral protrusions. While some embodiments of the present invention have incorporated a carrier with a lateral projection on one side, the absence of a corresponding extension on the other side has permitted the wiper to be moved very close to at least one end of the assembly. Other embodiments have permitted a close approach to both ends.

In the device of Figs. 17 to 20, the carrier 11e is restrained against all rocking movement by its three side bearings 75, 76 and 77 on the helix 2e, as shown in Figs. 18 and 20. The carrier is partially supported by the rollers 59e and 59e', mounted in the two widely spaced lower legs of the carrier. Further support for the carrier is provided by the upper portion 78 of the rotor 22e which abuts against the top 79 of a recess provided in the carrier 11e, as shown in Figs. 18 and 20. The sides of this recess provide a smooth running fit for the carrier 11e along rotor 22e, such smooth fit being assured by proper lapping. It will be clear that any rotation of the rotor 22e will be imparted to the carrier by contact of the sides of the upper portion of the rotor with the sides of the recess in which it nests in the carrier. The top radial groove or recess 80 in the carrier is of sufficient depth and width to permit the wiper spring 14e to be mounted therein by suitable means such as by the screw 20e, Fig. 18. Besides its usual purpose of holding the sliding contact against the helix, the wiper spring performs the additional function of maintaining the upper edge 79 of the recess in the carrier in firm engagement with the top edge 78 of the rotor. For the sake of clarity, this spring has been omitted from Fig. 20. The leaf spring has a lower extension 21e that is curved as shown in Fig. 18. This portion of the leaf spring extends through an opening 81 in the carrier in order that its suitably shaped lower end may engage the rotor 22e and make sliding electrical contact therewith. This rotor is a flat piece of metal mounted at its left end in a recess in the rotatable stub shaft 33e and at its right end by means of a similar slot in the insulating coupling 82. The opposite end of this insulating coupler has a central round hole to receive the control shaft 37e. It will be noted that the right end of the rotor 22e is recessed to receive the insulating coupler, thus permitting edge 78 to extend beyond the left end of the coupler in order to provide a continuous bearing for the carrier almost to the extreme right end of the coupler. Inasmuch as this insulating coupler electrically isolates the control shaft 37e from the rotor, the latter may be used to electrically connect the wiper with the leaf spring 65e and the integral terminal lug 64e on the left end of the cylindrical housing.

Figure 21:
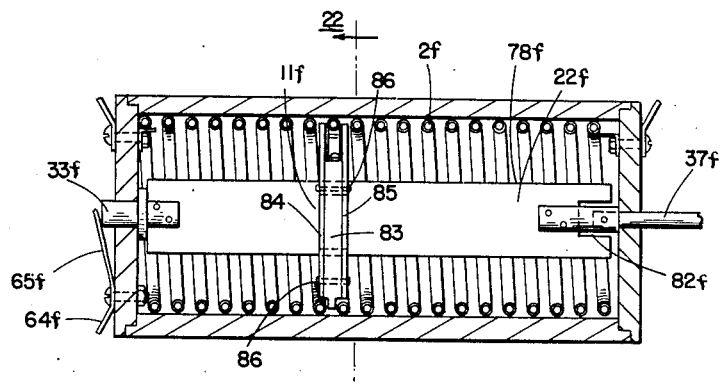
Fig. 21 is a longitudinal view, partly broken away, of a modification of some of the structure shown in the preceding figures.
Figure 22:
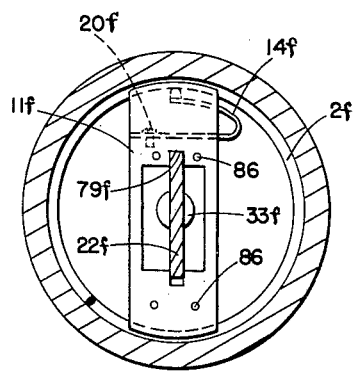
Fig. 22 is a section taken along line 22—22 of Fig. 21 with certain parts added for the sake of clarity.
Figure 23:
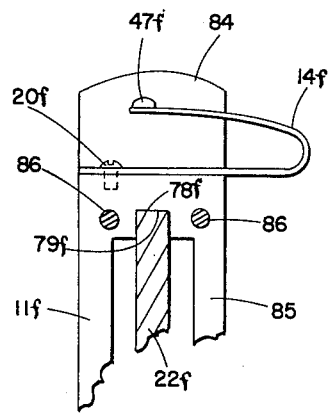
Fig. 23 is an enlarged detail of the wiper and a portion of the carrier shown in Fig. 2.

Figs. 21 to 23 illustrate still another embodiment of my invention. In the structure shown in these figures, the carrier 11f engages the sides of the helix at diametrically opposite positions, as in the embodiment of Figs. 10 and 11. Unlike the embodiment of Figs. 10 and 11, however, the carrier in the devices of Figs. 21 to 23 has radial support in one direction on the rotor 22f, the top edge 79f of the recess in the carrier abutting against the top edge 78f of the rotor, as in the form shown in Figs. 17 to 20. The resilience of the wiper spring 14f holds these surfaces in firm engagement. The flanges of the carrier that engage the sides of the helical turns in Figs. 21 to 23 may of course follow a track provided on the inner surface of the cylindrical assembly, as explained in connection with previously discussed figures.

The carrier in the structure of Figs. 21 to 23 comprises a central member 83 formed of metal having good electrical contact characteristics and two relatively thin non-conducting side members 84 and 85 whose ends extend beyond the ends of the center member in order to provide side bearings for the carrier against the helix, as indicated in Fig. 21. It will be understood, of course, that a helical track on the inner surface of the cylinder assembly may be substituted for the helix as a guide for the outwardly extending ends of the side pieces 84 and 85. Members 83, 84 and 85 may be held together by any convenient means, such as by the rivets 86. At the end of this carrier that supports the wiper spring, sufficient space is provided beyond the end of the central member 83 and between the corresponding ends of the side members 84 and 85 to receive the wiper spring and to permit of its mounting therein, such mounting being provided by screw 20f. Inasmuch as the insulating coupler 82f electrically isolates the control shaft 37f from the rotor 22f as in the embodiment last hereinbefore described, the rotor may serve in similar manner to electrically connect the contact 47f with the terminal lug 64f on the left end of the housing, the circuit being completed from the said contact through the wiper spring, the mounting screw 20f, the conducting central member 83 of the carrier 11f, the rotor 22f, the stub shaft 33f, the leaf spring 65f and the lug 64f which is integral therewith.

In each of the embodiments shown in the figures and hereinbefore described, the carrier is supported by one or other of the following: one or more helices of resistance wire, as indicated in Figs. 13 and 16; helically extending grooves on the inner walls of the cylinder, as shown in Fig. 14; or by a projecting thread on the inner wall of the cylinder as shown in Fig. 15. All of these extend in relief from the inner wall of the cylinder and they may therefore be broadly referred to as relief portions.

Various embodiments of my invention have been disclosed in order to make it clear that my invention is broad in scope and not confined to a combination of specific components. The components illustrated in the various figures may be replaced by others that perform the same respective functions—all without departing from the broad spirit of my invention as set forth in the appended claims. It will also be apparent to those skilled in the art that various omissions, additions, and changes My claims are:

1. In a variable resistor, a combination including: a cylinder assembly having helically extending relief portions on the inner surface thereof, said relief portions comprising a helically wound resistance element; a wiper in yielding engagement with said element; a carrier for said wiper, said carrier being slidably keyed to said helically extending relief portions at a plurality of points some of which are located at least 120 degrees along the helix from other such keying points; and means for applying a turning moment to said carrier; said carrier being supported by said helically extending relief portions independently of said means.

2. In a variable resistor, a combination including: a cylinder assembly comprising a cylindrical casing with a helically wound resistance element attached to the inner wall thereof; a resilient wiper slidably engaging said element; a carrier for said wiper, said carrier being supported entirely by said cylinder assembly; means for applying a turning moment to said carrier; and means for causing said carrier to advance axially of said cylinder assembly as it turns in response to the application of said turning moment.

3. In a variable resistor, a combination including: a cylinder assembly having helically extending relief portions on the inner surface thereof, said relief portions comprising a helically wound resistance element; a wiper in yielding engagement with said element; a carrier for said wiper, said carrier having three radially extending legs each keyed to said helically extending relief portions; and means for applying a turning moment to said carrier.

4. In a variable resistor, a combination including: a cylinder assembly comprising a cylindrical casing and a helically wound resistance element on the inner surface thereof; a resilient wiper slidably engaging said element; a carrier for said wiper, said carrier being directly supported by said cylinder assembly; and an elongated rotor disposed within said cylinder assembly and extending axially thereof, said rotor passing said carrier and comprising a first longitudinally extending member displaced from the axis of said rotor for applying a turning moment to said carrier and a second longitudinally extending member free from engagement with said carrier for giving rigidity to said rotor.

5. In a variable resistor, a combination including: a cylinder assembly having helically extending relief portions on the inner surface thereof, said relief portions comprising a helically wound resistance element; a resilient wiper slidably engaging said element; a carrier for said wiper, said carrier being directly supported by said cylinder assembly and movably keyed to said helically extending relief portions; and an elongated rotor disposed within said cylinder assembly and extending axially thereof, said rotor passing said carrier and comprising a first longitudinally extending member displaced from the axis of said rotor for applying a turning moment to said carrier and a second longitudinally extending member free from engagement with said carrier for giving rigidity to said rotor.

References Cited in the file of this patent

UNITED STATES PATENTS

| | | |
|---|---|---|
| 2,371,159 | Erb | Mar. 13, 1945 |
| 2,454,986 | Beckman | Nov. 30, 1948 |